United States Patent [19]

Tanaka et al.

[11] Patent Number: 4,725,424
[45] Date of Patent: Feb. 16, 1988

[54] PROCESS FOR PRODUCING CARBON BLACK

[75] Inventors: Mitsuru Tanaka, Isehara; Takanori Uchida; Hideyuki Hisashi, both of Machida, all of Japan

[73] Assignee: Mitsubishi Chemical Industries, Ltd., Tokyo, Japan

[21] Appl. No.: 777,292

[22] Filed: Sep. 18, 1985

[30] Foreign Application Priority Data

Sep. 18, 1984 [JP] Japan ................. 59-195553

[51] Int. Cl.$^4$ .................... C01B 31/02; C09C 1/48
[52] U.S. Cl. .................... 423/450; 423/449; 423/458
[58] Field of Search ............ 423/449, 450, 455, 456, 423/457, 458

[56] References Cited

U.S. PATENT DOCUMENTS 3,637,350 1/1972 Thomas ................. 423/449
3,642,446 2/1972 Heller ................. 423/455
4,088,741 5/1978 Takewell ................. 423/450

Primary Examiner—Gregory A. Heller
Attorney, Agent, or Firm—Oblon, Fisher, Spivak, McClelland & Maier

[57] ABSTRACT

A process for producing carbon black by a furnace method wherein carbon black is produced in a reaction system comprising a first zone where a mixture of a fuel hydrocarbon and an oxygen-containing gas is burned to form a high temperature combustion gas atmosphere, and a starting oil material is continuously supplied to the high temperature combustion gas atmosphere, and a second zone, as a down-stream zone subsequent to the first zone, where a carbon black-suspended hot gas formed in the first zone flows in and is rapidly cooled, characterized in that carbon dioxide or carbon dioxide and steam are supplied to the first zone and/or the second zone to bring the carbon dioxide concentration in the second zone within a range of from 15 to 70% by volume, and the retention time of the carbon black-suspended hot gas in the second zone is at least 0.2 second.

8 Claims, 2 Drawing Figures

PROCESS FOR PRODUCING CARBON BLACK

The present invention relates to a process for producing carbon black which is useful for a reinforcing agent, a coloring agent, an electric conductive agent, etc. More particularly, the present invention relates to a process for producing carbon black having a high specific surface area which exhibits excellent conductivity when blended into a resin or rubber.

In general, the production of carbon black by a furnace method is conducted in such a manner that a hydrocarbon material is jetted from a nozzle of a burner into a furnace with a high temperature combustion gas atmosphere formed by burning a mixture of a fuel hydrocarbon and an oxygen-containing gas such as air, whereby the hydrocarbon material is subjected to partial combustion and/or pyrolysis.

Carbon black formed by the partial combustion and/or pyrolysis of the hydrocarbon material, is present in a high temperature combustion gas in a suspended state. This carbon black is separated and collected by e.g. a cyclone or bag filter after being cooled by a commonly employed method. The collected carbon black may be granulated, if necessary, by a conventional method.

As conventional processes for the production of furnace carbon black suitable for electric conductivity having a high specific surface area, there have been known processes disclosed in Japanese Unexamined Patent Publication No. 24455/1981 and No. 195162/1982. Namely, Japanese Unexamined Patent Publication No. 24455/1981 discloses a process wherein steam is introduced into a combustion gas. Whereas, Japanese Unexamined Patent Publication No. 195162/1982 discloses a process for producing carbon black having a high specific surface area by introducing calcium, barium, strontium, etc. at a stage prior to the supply of the hydrocarbon material.

However, according to the process disclosed in Japanese Unexamined Patent Publication No. 24455/1981, it is necessary to prolong the retention time to obtain carbon black having a high specific surface area, and yet the yield of carbon black is low. Further, when blended into a resin, the dispersibility is not fully satisfactory.

On the other hand, according to the process disclosed in Japanese Unexamined Patent Publication No. 195162/1982, calcium, etc. introduced into the collected carbon black, will remain almost in the entirety, thus leading to a product containing so-called impurities, and such a product is restricted in the field of its applications.

Under these circumstances, the present inventors have conducted extensive research to develop a process for readily and economically producing carbon black having a high specific surface area without the above-mentioned problems, and as a result, have found that such an object can be attained by supplying carbon dioxide (hereinafter referred to simply as "$CO_2$") or $CO_2$ and steam, and the hydrocarbon material is decomposed in a steamed atmosphere with the $CO_2$ concentration in the combustion gas being higher than the conventional method, or the formed carbon black is introduced thereinto in a steamed atmosphere having a high $CO_2$ concentration.

An object of the present invention is to provide an improved furnace method so that carbon black having a high specific surface area suitable for imparting electric conductivity to a resin or rubber, is produced in good yield in a short period of time.

According to the present invention, this object is accomplished by a process for producing carbon black by a furnace method wherein carbon black is produced in a reaction system comprising a first zone where a mixture of a fuel hydrocarbon and an oxygen-containing gas is burned to form a high temperature combustion gas atmosphere, and a starting oil material is continuously supplied to the high temperature combustion gas atmosphere, and a second zone, as a down-stream zone subsequent to the first zone, where a carbon black-suspended hot gas formed in the first zone flows in and is rapidly cooled, characterized in that carbon dioxide or carbon dioxide and steam are supplied to the first zone and/or the second zone to bring the carbon dioxide concentration in the second zone within a range of from 15 to 70% by volume, and the retention time of the carbon black-suspended hot gas in the second zone is at least 0.2 second.

Now, the present invention will be described in detail with reference to the preferred embodiments.

In the accompanying drawings.

As the starting oil material for the production of carbon black having a high specific surface area of the present invention, there may be employed any starting oil material commonly employed in the production of carbon black. For instance, there may be mentioned an aromatic hydrocarbon such as benzene, toluene, xylene, naphthalene or anthrathene, or a tar-type or petroleum-type decomposed heavy oil such as creosote oil, anthracence oil, naphthalene, pitch oil, ethylene bottom oil or FCC oil. If necessary, a natural gas may be employed.

As a fuel hydrocarbon to be burned to obtain a heat necessary for the decomposition of the starting oil material, there may be employed any fuel among gas fuels such as natural gas, propane, butane or coke oven gas, or liquid fuels such as kerosine, kerosene light oil, C-heavy oil or creosote oil, so long as it can readily be burned completely and is capable of providing heat necessary for the pyrolysis of the starting oil material.

As the oxygen-containing gas to burn the fuel hydrocarbon, it is common to employ air. However, oxygen may be mixed to the air gas the case requires.

Figure 1:
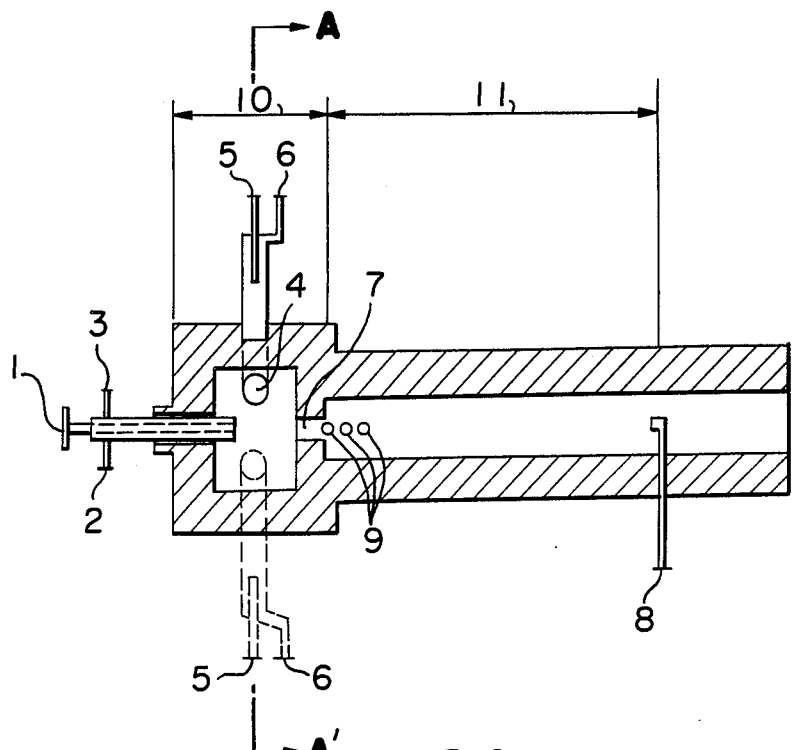
FIG. 1 is a diagrammatic cross sectional view of a furnace for the production of carbon black to be used in the present invention.
Figure 2:
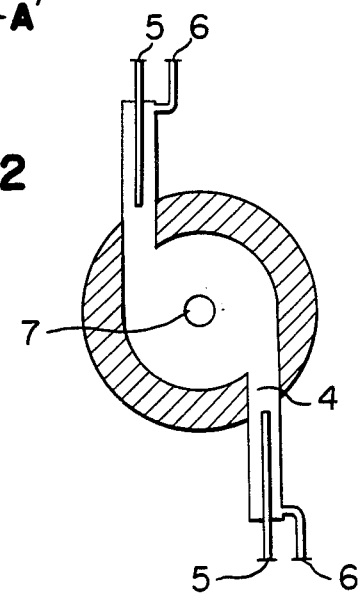
FIG. 2 is a diagrammatic side view of a vertical cross section along line A—A' in FIG. 1.

As the furnace for the production of carbon black to be used in the present invention, there may be employed any furnace which is commonly employed for a furnace method. For instance, a furnace for the production of carbon black having a structure as shown in FIGS. 1 and 2, may be employed. Reference numeral 1 indicates a burner for supplying the starting oil material, numeral 2 indicates an inlet for burner-cooling water, numeral 3 indicates an outlet for the burner-cooling water, numeral 4 indicates an inlet for a combustion gas, numeral 5 is a burner for supplying a fuel hydrocarbon, numeral 6 is an inlet for supplying air, numeral 7 indicates a choke, numeral 8 indicates a spray tube for cooling water to stop the reaction, numeral 9 indicates holes for supplying $CO_2$ and steam, numeral 10 indicates the first zone, and numeral 11 indicates the second zone. The fuel hydrocarbon is supplied from the fuel hydrocarbon supply burner 5 and reacted with the oxygen-containing gas supplied from the air supply inlet 6, and then passes through the combustion gas inlet 4 and enters a cylindrical combustion chamber where it forms the first zone 10 of a high temperature circulating combustion gas atmosphere. The temperature of the first zone is preferably at least 1400° C., more preferably at least 1600° C.

The starting oil material is continuously supplied and jetted into the first reaction zone 10 from the starting oil material supply burner 1 which is open in the axial direction of the high temperature circulating combustion gas stream, and pyrolyzed.

Then, the carbon black-suspended hot gas obtained by the pyrolysis in the first reaction zone 10 is introduced into the second zone 11 via the choke 7, whereby the specific surface area of carbon black is increased by the activating reaction. The activating reaction is terminated by spraying cooling water from the cooling water spray tube 8 for stopping the reaction. Carbon black having a large specific surface area thereby obtained is isolated by a separation and recovery step. Carbon black is formed mainly by the pyrolytic reaction in the first zone 10. However, the boundary region between the first zone 10 and the second zone 11 has substantially the same high temperature atmosphere, and in the present invention, the zone from the outlet of the choke 7 to the portion where carbon black-suspended hot gas is rapidly cooled, is designated as the second zone.

Here, the present inventors have paid a particular attention to $CO_2$ for the production of carbon black having a high specific surface area, and have found that when $CO_2$ gas is supplied to the second zone, and the treatment for a certain specific retention time is combined, it has been found that the longer the reaction time at a high temperature and the higher the $CO_2$ concentration, the higher the specific surface area of the resulting carbon black becomes, and further it has been surprisingly found that it is possible to obtain carbon black having a greater number of fine pores of at most about 20 Å and having a large specific surface area in good yield in an extremely short period of time as compared with the case where steam is supplied, particularly at a high temperature. Further, carbon black obtained by supplying $CO_2$, was incorporated into a resin, and the conductivity and dispersibility were measured, whereby the dispersibility was found to be improved, while no substantial difference was observed in the electric conductivity with the same specific surface area, as compared with the carbon black obtained by supplying steam. $CO_2$ is supplied in an amount to bring the $CO_2$ concentration in the second zone within a range of from 15 to 70% by volume, preferably from 20 to 50% by volume.

If the $CO_2$ concentration is less than 15% by volume, it takes a long time to attain a high specific surface area, and the volume of the second zone is required to be large. On the other hand, if the $CO_2$ concentration is more than 70% by volume, the amount of carbon black-suspended gas increases as a great amount of $CO_2$ is supplied, whereby the treating capacity of the separation and recovery apparatus such as a bag filter will have to be increased.

Accordingly, for the selection of the $CO_2$ concentration in the practical operation, it is advisable to select the optimum concentration taking into consideration not only the properties of the carbon black to be obtained, but also the economy to satisfy the above-mentioned requirements.

Carbon black having an adequately large specific surface area is obtainable by supplying $CO_2$ to the first zone 10 and/or the second zone 11 within the above-mentioned range of the $CO_2$ concentration. However, if necessary, steam may be used in combination with $CO_2$.

The steam concentration in this case is preferably from 5 to 40% by volume, more preferably from 10 to 30% by volume. If the supply is less than 5% by volume, no adequate economical advantage will be obtained. On the other hand, if the steam concentration exceeds 40% by volume, the clogging of the bag filter or corrosion will increase, such being undesirable.

Namely, as mentioned above, in the production of carbon black by a furnace method, a water is sprayed from the rear side of the second zone 11 i.e. from the cooling water spray tube 8 for stopping the reaction. If the steam concentration before the spray tube 8 exceeds 40% by volume, the steam concentration including the water for stopping the reaction at the rear portion of the second zone will be from about 60 to about 80% by volume, whereby not only the trouble of clogging of the separation and recovery system such as the bag filter, but also further disadvantages such as corrosion of the separation and recovery system, will be brought about.

The $CO_2$ gas or the $CO_2$ gas and steam will be supplied to the first zone 10 together with an oxygen-containing gas from the air supply inlet 4, or to the second zone 11 by supply holes 9 provided at an up-stream of the second zone 11, or to the first zone 10 and the second zone 11 simultaneously. Any one of the above methods may be employed. The supply may be made from one portion or from a plurality of portions. Further, in the case where $CO_2$ and steam are supplied, they may be supplied separately, or simultaneously from the same portion.

Further, they may be supplied after being heated to a desired temperature by using e.g. a coke oven gas or combustion waste gas outside the furnace for the production. In the present invention, $CO_2$ or $CO_2$ and steam are supplied, but other components may be incorporated so long as they do not adversely affect the activating reaction.

The retention time in the furnace for the purpose of the present invention is the time from the initial point in the second zone 11 to the termination of the reaction by spraying e.g. water to the formed carbon black-suspended gas. The retention time is usually at least 0.2 second, preferably at least 0.5 second, more preferably at least 1.0 second, although it depends upon the desired specific surface area.

The $CO_2$ concentration and steam concentration for the purpose of the present invention are the values measured in front of the cooling water spray tube 8 for stopping the reaction.

Carbon black obtained by the process of the present invention preferably has a specific surface area within a range of from about 600 to 1700 $m^2/g$, preferably from about 800 to 1500 $m^2/g$ as measured by BET method. This is one of the features of the carbon black obtained by the process of the present invention.

If the specific surface area is less than about 600 $m^2/g$, such carbon black will be required to be incorporated in a great amount in order to obtain a desired electric conductivity, and accordingly, the viscosity of the resin compound will be higher to obtain the same level of electric conductivity, and the processing will be difficult.

On the other hand, if the specific surface area exceeds about 1700 m$^2$/g, the yield of the carbon black product will be substantially reduced, such being undesirable.

Now, the analytical methods for the evaluation of the physical properties of the carbon black obtained by the present invention, will be described.

(1) Specific surface area

The specific surface area was measured by BET method. Namely, the amount of nitrogen adsorption by carbon black was measured by a low temperature nitrogen adsorption method, and the specific surface area was calculated from the measured value by a multipoint method by using the formula of BET.

(2) DBP absorption

The DBP absorption was measured in accordance with JIS-K-6221-A by using dibutyl phthalate (DBP).

(3) Volume resistance (VR)

For the measurement of the volume resistance, 7 g of carbon black was blended to 43 g of a PVC resin (Vinica Compound-2513 Clear, manufactured by Mitsubishi Monsanto Chemical Company), and then the mixture was thoroughly kneaded by means of mixing rolls heated to a temperature of 130±5° C.

After the kneading, the composition comprising carbon black and resin thus obtained, was passed through a pair of rolls with a distance of 3 mm at a temperature of 130±5° C. to obtain a sheet-form composition having a thickness of about 3 mm. Then, this sheet-form composition was pressed at 160° C. under a pressure of 200 kg/cm$^2$ for one minute to obtain a flat plate of 100×100×2 (mm).

After cooling the flat plate to normal temperature by a cooling press, it was cut into a test piece having a length of 100 mm and a width of 20 mm by means of an ultrasonic cutter.

A conductive paste was coated with a width of 5 mm so that the distance between a pair of electrodes was 70 mm in the longitudinal direction of the test piece. After the paste was completely dried, the resistance (R) was measured at a temperature of 25° C. under a relative humidity of 60%. The volume resistance wa then calculated from the data in accordance with the following equation.

$$VR = \frac{R.T.W.}{L}$$

VR: Volume resistance (Ω·cm)
L: Distance between electrodes (cm)
T: Thickness of the test piece (cm)
W: Width of the test piece (cm)

(4) Microporosity

By using the apparatus for measuring the specific surface area as mentioned in item (1), pore volumes of pores of from 10 to 300Å were obtained by an Inclay-Cranston's equation, and the microporosity was calculated from the pore volumes in accordance with the following equation.

$$\text{Microposity}(\%) = \frac{\text{Pore volume of pores of 10–20Å}}{\text{Pore volume of pores of 10–50Å}} \times 100$$

(5) Dispersibility of carbon black in a resin

A part of the test piece for the measurement of the volume resistance was cut into a particle of from about 0.5 to about 0.8 μm. This particle was put on a slide glass, and observed and photographed by an optical microscope with 400 magnifications, and the photograph was enlarged 520 times, and the dispersibility was evaluated by the following standards.

⊙: Most agglomerates have a particle size of not more than 1 μm, but there are not more than 10 agglomerates having a particle size of from 1 to 4 μm. Or, the length of agglomerates obtained by multiplying the diameter of agglomerates having a particle size of at least 1 μm within the visual field of 70 mm×90 mm by the number of such agglomerates, is not more than 40 μm.

○: Most agglomerates have a particle size of not more than 2 μm, but there are not more than 20 agglomerates having a particle size of from 1 to 7 μm. Or, the length of agglomerates as mentioned above is not more than 140 μm.

Δ: Most agglomerates have a particle size of not higher than 2 μm, but there are not more than 30 agglomerates having a particle size of from 1 to 10 μm. Or, the length of agglomerates as mentioned above is not more than 300 μm.

X: Worse than Δ.

Now, the present invention will be described in further detail with reference to Examples. However, it should be understood that the present invention is by no means restricted to these specific Examples.

EXAMPLES 1 TO 8

As the furnace for the production of carbon black, there was employed a furnace having a structure with a first zone 10 and a second zone 11 as shown in FIGS. 1 and 2.

As the fuel hydrocarbon, there was employed a coke oven gas composed of about 2.6% of carbon dioxide, about 3.2% of hydrocarbons other than methane, about 0.1% of oxygen, about 3.1% of carbon monoxide, about 54.7% of hydrogen, about 29.5% of methane and about 2.8% of nitrogen. As the starting oil material, creosote oil having a specific gravity of 1.11 at 40° C., an average molecular weight of 182, a C/H ratio of 14.7 and a B.M.C.I. value of 158 was employed. In Examples 1 to 7, 473 Nm$^3$/hr of the above-mentioned coke oven gas as the fuel hydrocarbon was introduced together with 3200 Nm$^3$/hr of air as the oxygen-containing gas from the combustion gas inlet 4 and 330 kg/hr of the above creosote oil as the starting oil material was introduced from the starting oil material supply burner 1 into the first zone 10 and thermally decomposed, and the activating reaction was conducted in the second zone under the CO$_2$ concentration, the retention time and the temperature as identified in Table 1. Cooling water was sprayed from cooling water spray tube 8 for the termination of the reaction, followed by the separation and recovery by means of a cyclone and a bag filter, whereby carbon black of the present invention was obtained.

The cooling water for the termination of the reaction was sprayed in an amount to bring the outlet temperature of the furnace for the production of carbon black to a level of about 500° C. Further, the temperature at the second zone is a temperature measured at a location 3000 mm down-stream of the outlet of the choke 7.

Further, the retention time was controlled by changing the position of the spraying of the cooling water for the termination of the reaction.

In Example 8, a gas mixture comprising 2560 Nm$^3$/hr of air, 134 Nm$^3$/hr of pure oxygen and 506 Nm$^3$/hr of carbon dioxide, was used instead of 3200 Nm$^3$/hr of air as the oxygen-containing gas. The physical properties of carbon blacks thus obtained are shown in Table 1.

EXAMPLES 9 TO 15

Carbon blacks were prepared in the same manner as in Example 1 except that not only carbon dioxide but also steam was supplied to the second zone from the supply holes 9, and the temperature, the $CO_2$ concentration, the steam concentration and the retention time in the second zone were changed as shown in Table 2.

However, in Example 15, a gas mixture comprising 1600 $Nm^3/hr$ of air, 336 $Nm^3/hr$ of pure oxygen and 1264 $Nm^3/hr$ of carbon dioxide, was used instead of 3200 $Nm^3/hr$ of air as the oxygen-containing gas.

The physical properties of carbon blacks thus obtained are shown in Table 2.

COMPARATIVE EXAMPLES 1 TO 5

Comparative Example 1 was conducted in the same manner as in Example 1 except that the retention time in the second zone was changed to 0.1 second. Comparative Example 2 was conducted in the same manner as in Example 1 except that no carbon dioxide was supplied, and the retention time was changed to 1.5 seconds. The results of these Comparative Examples are shown in Table 1.

Comparative Example 3 was conducted in the same manner as in Example 11 except that the retention time was changed to 0.1 second. The results are shown in Table 2.

Comparative Examples 4 and 5 were conducted in the same manner as Examples except that steam was supplied to the first zone and no $CO_2$ was supplied, and the conditions in the second zone were as shown in Table 3. The results are shown in Table 3.

TABLE 1

| Examples | Second reaction zone | | | Specific surface area ($m^2/g$) | Micro-porosity (%) | DBP (cc/100 g) | Dispersibility | VR ($\Omega \cdot cm$) |
| --- | --- | --- | --- | --- | --- | --- | --- | --- |
| | Temperature(°C.) | $CO_2$ concentration (Vol %) | Retention time (sec.) | | | | | |
| 1 | 1500 | 20 | 2.0 | 1510 | 38.5 | 375 | ⊙ | 6.4 |
| 2 | 1600 | 20 | 0.7 | 1350 | 32.2 | 325 | ⊚ | 11.8 |
| 3 | 1700 | 20 | 0.4 | 1410 | 34.8 | 340 | — | 9.4 |
| 4 | 1600 | 30 | 0.7 | 1300 | 30.4 | — | ⊚ | — |
| 5 | 1600 | 50 | 0.6 | 1270 | 29.2 | — | ○ | 16.0 |
| 6 | 1700 | 30 | 0.2 | 970 | 17.6 | — | ○ | 49.0 |
| 7 | 1700 | 30 | 0.3 | 1240 | 28.0 | 290 | ○ | 17.9 |
| 8 | 1700 | 20 | 0.4 | 1170 | 25.5 | — | ○ | — |
| Comparative Example 1 | 1500 | 20 | 0.1 | 550 | — | 178 | ○ | 260.0 |
| Comparative Example 2 | 1500 | | 1.5 | 1050 | 7.5 | 230 | ○ | 44.0 |

Note:
Symbol "—" indicates that no measurement was made.

TABLE 2

| Examples | Second reaction zone | | | | Specific surface area ($m^2/g$) | Micro-porosity (%) | DBP (cc/100 g) | Dispersibility | VR ($\Omega \cdot cm$) |
| --- | --- | --- | --- | --- | --- | --- | --- | --- | --- |
| | Temperature(°C.) | $CO_2$ concentration (Vol %) | Steam concentration (Vol %) | Retention time (sec.) | | | | | |
| 9 | 1500 | 30 | 15 | 0.9 | 1210 | 24.4 | 280 | ○ | 20.0 |
| 10 | 1600 | 30 | 15 | 0.7 | 1300 | 27.9 | 310 | ⊙ | 14.1 |
| 11 | 1700 | 30 | 15 | 0.25 | 1150 | 24.3 | — | — | 25.0 |
| 12 | 1600 | 20 | 15 | 0.7 | 1315 | 28.6 | 315 | ⊚ | 13.5 |
| 13 | 1500 | 30 | 15 | 1.5 | 1305 | 28.0 | — | ○ | — |
| 14 | 1500 | 20 | 30 | 1.5 | 1290 | 24.8 | — | — | 14.9 |
| 15 | 1500 | 60 | 15 | 1.5 | 1425 | 33.9 | 347 | ○ | 9.0 |
| Comparative Example 3 | 1700 | 30 | 15 | 0.1 | 720 | — | — | △~○ | 130 |

Note:
Symbol "—" indicates that no measurement was made.

TABLE 3

| Comparative Examples | Second reaction zone | | | Specific surface area ($m^2/g$) | Micro-porosity (%) | DBP (cc/100 g) | Dispersibility | VR ($\Omega \cdot cm$) |
| --- | --- | --- | --- | --- | --- | --- | --- | --- |
| | Temperature(°C.) | steam concentration (Vol %) | Retention time (sec.) | | | | | |
| 4 | 1600 | 40 | 1.0 | 1500 | 21.8 | — | X | 8.1 |
| 5 | 1600 | 20 | 1.0 | 1420 | 19.2 | 345 | X | — |

Note:
Symbol "—" indicates that no measurement was made.

We claim:
1. A process for producing carbon black, having a specific surface area of from about 600 to about 1700 $m^2/g$ as measured by the BET method, by a furnace method, comprising:
   (a) burning a mixture of a hydrocarbon fuel and an oxygen-containing gas in a first zone thereby forming a high temperature combustion gas into which a starting oil material is continuously inserted which results in the formation of a hot gas containing suspended carbon black;
   (b) rapidly cooling said hot gas containing suspended carbon black as said gas passes into and through a second zone such that it has a retention time of at least 0.2 second in said second zone; and
   (c) supplying carbon dioxide or a mixture of carbon dioxide and steam to either the first zone, said sec- ond zone or both such that the concentration of carbon dioxide in the second zone is brought to within the range of 15 to 70% by volume.

2. The process according to claim 1, wherein the carbon dioxide concentration in the second zone is within a range of from 15 to 70% by volume, and the steam concentration is within the range of from 5 to 40% by volume.

3. The process according to claim 1, wherein the carbon dioxide concentration is within a range of from 20 to 50% by volume.

4. The process according to claim 2, wherein the steam concentration is from 10 to 30% by volume.

5. The process according to claim 1, wherein the retention time is at least 0.5 second.

6. The process according to claim 1, wherein the retention time is at least 1 second.

7. The process according to claim 1, wherein the specific surface area of carbon black is from about 800 to about 1500 $m^2/g$ as measured by the BET method.

8. A process for producing carbon black, having a specific surface area of from about 600 to abut 1700 $m^2/g$ as measured by the BET method, by a furnace method, comprising:
(a) burning a mixture of a hydrocarbon fuel and an oxygen-containing gas in a first zone thereby forming a high temperature combustion gas into which a starting oil material is continuously inserted which results in the formation of a hot gas containing suspended carbon black;
(b) rapidly cooling said hot gas containing suspended carbon black as said hot gas passes into and through a second zone such that it has a retention time of at least 0.2 second in said second zone; and
(c) supplying a mixture of carbon dioxide and steam to either the first zone, said second zone or both such that the concentrations of carbon dioxide and steam in the second zone are brought to within the ranges of 15 to 70% by volume and 5 to 40% by volume, respectively.

* * * * *